Jan. 19, 1926. 1,569,894
G. STRANDT
WIRE CUTTING ATTACHMENT FOR MILK BOTTLE CAPPING MACHINES
Filed May 24, 1922
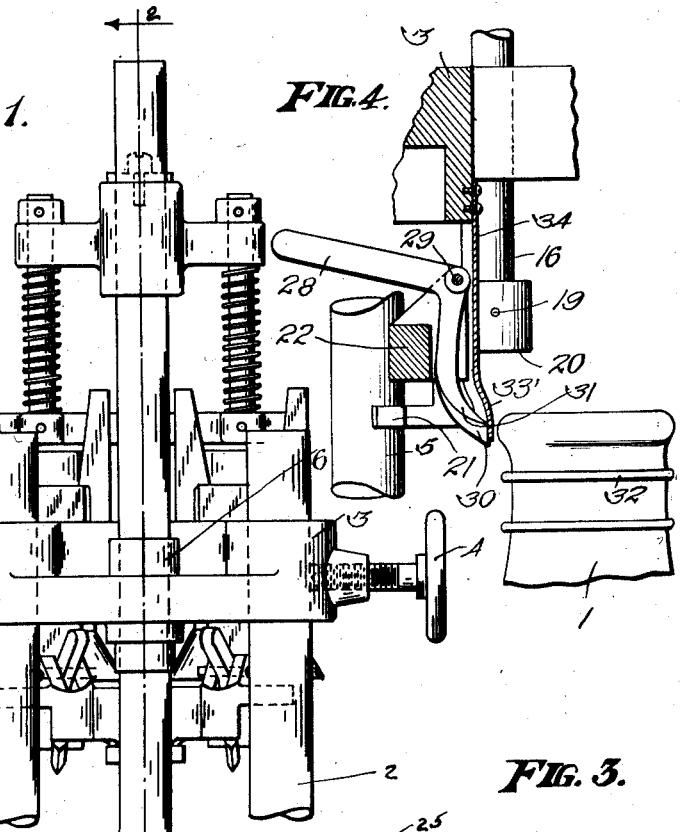
Gustav Strandt
INVENTOR.
BY
Erwin, Wheeler & Woolard
ATTORNEYS.

Patented Jan. 19, 1926.

1,569,894

UNITED STATES PATENT OFFICE.

GUSTAV STRANDT, OF MILWAUKEE, WISCONSIN, ASSIGNOR TO MILWAUKEE DAIRY SUPPLY MFG. CO., OF MILWAUKEE, WISCONSIN, A CORPORATION OF WISCONSIN.

WIRE-CUTTING ATTACHMENT FOR MILK-BOTTLE-CAPPING MACHINES.

Application filed May 24, 1922. Serial No. 563,316.

*To all whom it may concern:*

Be it known that I, GUSTAV STRANDT, a citizen of the United States, residing at Milwaukee, county of Milwaukee, and State of Wisconsin, have invented new and useful Improvements in Wire-Cutting Attachments for Milk-Bottle-Capping Machines, of which the following is a specification.

This invention relates to wire cutting attachments for bottle capping machines.

It is well known that bottles, such as milk bottles, are frequently capped in two distinct ways, namely, by inserting a circular pasteboard disk into the upper end of the bottle, and by covering the bottle end with a flexible piece of material and securing such material in position by means of a wire clamped around the neck of the bottle and over such material. The usual practice in opening these bottles is merely to tear the flexible material free from the bottle and to leave the wire ring about the neck of the bottle. It frequently happens, therefore, that when bottles are presented to the dairy for refilling that the wire rings are so numerous as to interfere with the convenient manipulation of the bottle.

The manual removal of these rings is a tedious and difficult operation and consumes a great deal of time.

It is, therefore, an object of this invention to provide a machine for automatically severing and removing the wire rings from the bottles, and to so organize this machine that it may form an attachment for milk bottle capping machines.

Further objects are to provide an attachment for bottle capping machines which may be mounted directly upon the traveling head of such machine; which will not needlessly complicate the structure of the machine; and which will function at the same time that the milk bottle capping machine functions.

Further objects are to provide a wire cutting attachment for bottle capping machines which is of extremely simple design; which is composed of a small number of parts; which has readily removable wire cutting knives; and which will function automatically at each operation of the machine.

An embodiment of the invention is shown in the accompanying drawings, in which:—

Fig. 1 is a rear elevation of the upper portion of a milk bottle capping machine.

Fig. 2 is a section on line 2—2 of Fig. 1, showing a bottle in position.

Fig. 3 is a view from the under side of the machine.

Fig. 4 is a fragmentary sectional view taken substantially on the line 4—4 of Fig. 3 showing the ring severing knife and mounting.

In milk bottle capping machines it is customary to provide a support, not shown, for the bottle 1. A pair of standards 2, 2 project upwardly from such base and act as supports for the stationary or body portion 3 of the milk-bottle capping machine,—such body portion having holes through which the rods 2 project. The desired adjustment of the entire device may be retained by a pair of manually operated screws 4 which are threaded through the body portion and bind against the standards 2. A vertical rod 5 passes loosely through a hub 6 on the body portion 3, and is adapted for vertical reciprocatory motion. The capping portion may be of any desired construction, and comprises a main portion 7 having a flanged funnel-shaped member 8 adapted to contact with the top of the bottle, and having a capping plunger 9 adapted to press the cap into the neck or mouth of the bottle. This mechanism is provided with a feeding device for the caps, but a further detailed description will not be given as its specific construction forms no part of the present invention. The bottle capping mechanism proper is movably related to the body portion 3 of the device, and is operated from a head 10 secured to the rod 5 in any of a plurality of positions of adjustment. A convenient means of secured this adjustment is by means of a slide 11 held to the head by means of a screw 12, and the headed pin 13.

This slide is adapted to pass into any one of a plurality of slots 14, formed in the rod 5, and is locked in position by means of a removable pin 15.

A second rod 16 is secured by means of a split pin 17 to the head 10 and passes loosely through a bushing 18 formed in the body portion 3. The lower end of this rod is secured as, for example, by means of a pin 19 to a relatively small cross-head 20, which has a bearing portion 21 contoured to fit the rod 5. This cross-head 20 has a pair of outwardly extending arms 22 and 23 which may be provided with guiding portions having contoured surfaces 25 and 26 adapted to contact with the standards 2, and to further guide and support the cross-head. Knives in the form of bell-crank levers having a downwardly extending arm 27 and a rearwardly extending arm 28 are pivotally mounted as indicated at 29 in the cross-head 20. The arm 27 is provided with a cutting edge 30 directed towards the bottle, and with a lower cutting edge 31 joining the first mentioned edge, and forming therewith a relatively sharp point. These knives, it will be seen from reference to the drawing, are so disposed that the weight of the arms 28 tends to throw them into contact with the bottle, thereby moving the cutting edges into contact with the bottle and allowing the point, formed by the cutting edges, to contact with the wire rings 32. It is desirable, however, to hold the knives away from the enlarged head 33 of the bottle 1. This is accomplished by means of downwardly projecting plates 33', which may conveniently be secured, as indicated at 34, to the body portion 3 of the machine. It will be seen, therefore, that when the cross-head 20 moves downwardly, the curved surface of the arm 27 will slide along the lower end of the strip 33' and allow the knife to move inwardly below the curved bottom portion of the enlarged head 33 of the bottle.

The operation of the device is as follows:

When the milk bottle capping portion 7 moves downwardly, the cup-shaped members 8 engage the heads or tops of the bottles. At the same time the cross-head 20 moves downwardly, and the lower ends 27 of the bell-crank levers move inwardly towards the bottle, thereby pressing the cutting edges against the wire rings 32, as indicated in dotted lines in Fig. 2. Upon further downward motion, the knives press the rings downwardly into their dotted line position shown in Fig. 2, and sever such rings,—the rings being opened outwardly by the tapered portion of the bottle.

It will be seen, therefore, that a wire cutting attachment has been provided which will automatically sever the wire rings found about bottle necks, which may be formed as a portion of the bottle capping machine, and which will act in unison therewith.

I claim:

1. In a bottle capping machine having a reciprocatory cross-head, a ring severing device for removing the rings from the necks of bottles, said device comprising a ring cutting knife pivotally carried by said cross-head, means for moving said knife about said pivot in a direction radially outwardly of a bottle when said reciprocatory cross-head is in a normally retracted position and in a direction radially inwardly of said bottle when said cross-head is moved to bottle capping position, whereby to maintain said knife out of contact with said bottle during the initial movement of the cross-head toward the bottle, and means for holding said bottle during the ring severing operation.

2. In a bottle capping machine having a stationary member and a reciprocatory cross-head, a ring severing device comprising a knife pivotally carried by said cross-head and means carried by said stationary member adapted to retract said knife when said cross-head is retracted from a bottle and to permit said knife to move into contact with the bottle below the upper margin thereof when said cross-head is moved toward said bottle, and means for holding said bottle during the ring severing operation.

3. In a bottle capping machine having a stationary member and a reciprocatory cross-head, a ring severing device carried by said cross-head and comprising a knife adapted for movement radially outwardly of a bottle beneath said capping machine, said stationary member having a portion disposed in the path of said knife when said cross-head is moved from said bottle, whereby to move said knife radially outwardly of said bottle when said cross-head is moved from said bottle, said knife being provided with means for automatically moving it toward said bottle when said cross-head is moved to bottle capping position, and means for holding said bottle during the ring severing operation.

4. In a milk bottle capping machine having a stationary member and a reciprocatory member, ring severing mechanism, said mechanism comprising a cutting knife pivotally carried by the reciprocatory member and having a weight arm adapted to raise said knife about its pivot, and a plate on said stationary member adapted to move said knife downwardly about its pivot, whereby when said reciprocatory member has moved away from a bottle therebeneath said knife will be withdrawn from contact with said bottle, and whereby when said reciprocatory member is moved toward said bottle said knife will be moved to contact therewith for ring cutting operations, and means for holding said bottle during ring severing operation.

5. A combined milk bottle capping and wire severing machine comprising a stationary member beneath which milk bottles are adapted to be positioned, reciprocatory means passing through said member, bottle capping mechanism carried by said reciprocatory means, supporting means mounted below said member and adapted to be moved upwardly and downwardly by said reciprocatory means, a knife pivotally carried by said supporting means and having a biased portion extending toward a position outwardly of said machine, and knife retracting means mounted upon said stationary portion for contact with said biased portion to guide said knife in its movement toward a bottle, whereby said knife will pass beneath the head of the bottle and will engage and sever rings carried by the neck of such bottle.

6. A combined milk bottle capping and ring severing machine comprising standards, a manually adjustable, stationary member carried by said standards, a reciprocatory rod passing through said member, milk bottle capping mechanism operated from said reciprocatory rod, a cross-head guided by said rod and said standards, means for communicating reciprocatory motion from said rod to said cross-head, a bell-crank lever pivotally mounted upon said cross-head and having an outwardly projecting arm and a downwardly projecting arm, said latter terminating in cutting faces, and guiding means carried by said stationary member and adapted to contact with the downwardly projecting arm to guide such arm and permit the cutting faces to be moved downwardly and outwardly upon reciprocation of said rod.

GUSTAV STRANDT.